Jan. 10, 1933.    G. W. GARMAN    1,893,771
ELECTRIC REGULATOR
Original Filed April 17, 1931
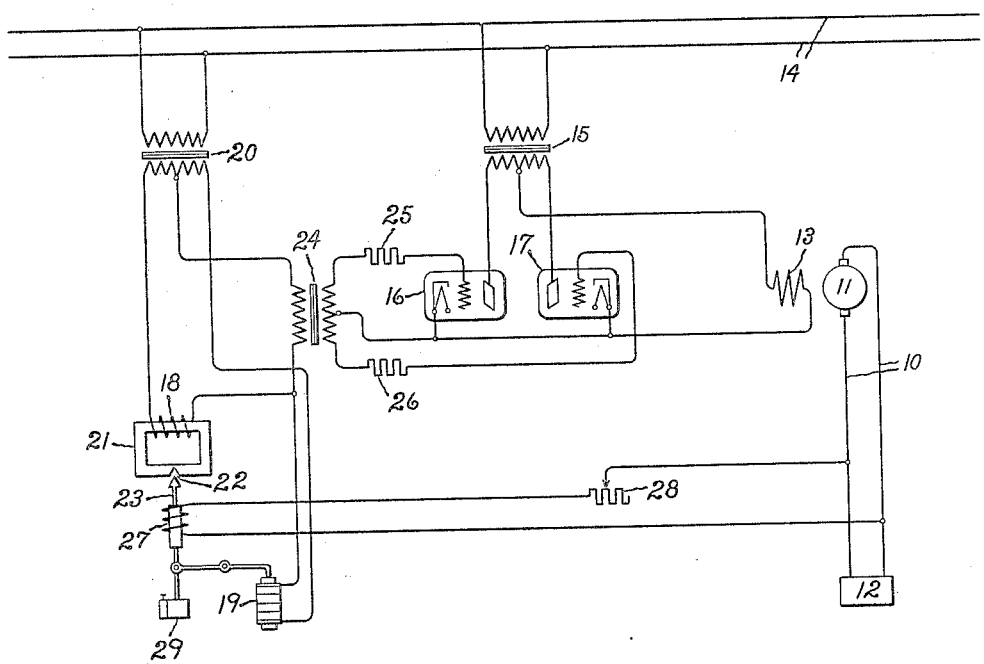
Inventor:
George W. Garman,
by Charles E. Sullar
His Attorney.

Patented Jan. 10, 1933

1,893,771

UNITED STATES PATENT OFFICE

GEORGE W. GARMAN, OF SCOTIA, NEW YORK, ASSIGNOR TO GENERAL ELECTRIC COMPANY, A CORPORATION OF NEW YORK

ELECTRIC REGULATOR

Application filed April 17, 1931, Serial No. 530,885. Renewed September 3, 1932.

My invention relates to apparatus for regulating the operation of electrical machines or circuits and more particularly to such apparatus utilizing electric valves for effecting the desired regulation.

Heretofore there have been proposed various arrangements including electric valves for regulating the voltage or other electrical condition of a machine or circuit. Some of these arrangements have the limitations that they are incapable of producing as fine a degree of regulation as required for stable operation of a machine or circuit under certain abnormal conditions. Certain regulating apparatus of this type are described in the copending application of G. E. Stack, Serial No. 464,094, filed June 26, 1930, assigned to the same assignee as the present application; which also discloses and broadly claims certain features described in this application.

It is an object of my invention to provide an improved regulating apparatus utilizing electric valves which is simple and reliable in operation and by means of which any desired fineness of regulation may be obtained.

It is a further object of my invention to provide an improved regulating apparatus including electric valves in which very close regulation may be obtained over wide variations in the electrical condition of the machine or circuit which is being regulated.

It is a still further object of my invention to provide an improved apparatus for shifting the phase of the grid potentials with respect to the anode potentials of the electric valves, which is of general application, but which is particularly suitable for use in connection with my improved regulating system.

In accordance with one embodiment of my invention, the field winding of a dynamo electric machine is energized from an alternating current circuit through a full wave rectifier including a pair of electric valves. An electrical condition, for example the potential, of the machine is maintained substantially constant by varying the phase relation between the grid and anode potentials of the electric valves in accordance with variations in the electrical condition of the machine. The improved apparatus for effecting this shift in the phase comprises an inductive winding provided with an electrical midpoint, a reactor, having a variable air gap, and a carbon pile resistor serially connected across the inductive winding, and a circuit for energizing the control grids of the electric valves connected between the electrical midpoint of the inductive winding and the junction between the reactor and the carbon pile resistor. A solenoid, energized in accordance with the condition of the machine to be controlled, acts jointly on the carbon pile and the variable air gap to maintain the electrical condition constant.

For a better understanding of my invention together with other and further objects thereof, reference is had to the following description taken in connection with the accompanying drawing, and its scope will be pointed out in the appended claims. The single figure of the accompanying drawing illustrates my invention as applied to an arrangement for maintaining constant the potential of a direct current generator.

Referring more particularly to the drawing, I have illustrated an arrangement for regulating the potential of a direct current circuit 10 energized from a direct current generator 11 and adapted to supply a load device or circuit 12. The machine 11 is provided with a field winding 13 which is energized from an alternating current circuit 14 through a full wave rectifier comprising a transformer 15 and electric valves 16 and 17. The electric valves 16 and 17 are each provided with an anode, a cathode, and a control grid and may be of any of the several types well known in the art, but I prefer to use valves of the vapor electric discharge type in which the starting of current in a valve is determined by the potential on its control grid but in which the current can be interrupted in the valve only by reducing its anode potential below the critical value. In order to control the output of the rectifier arrangement, I have provided a phase shifting circuit comprising a reactor 18 and a carbon pile resistor 19 serially connected across the secondary winding of a transformer 20, the primary winding of which is connected to the alternating current circuit 14. The secondary winding of this transformer is provided with an electrical midpoint. The reactor 18 is wound on a magnetic core 21 provided with an air gap 22 and a cooperating armature 23 by means of which the effective reactance of reactor 18 can be controlled. The primary winding of a grid transformer 24 is connected between the electrical midpoint of transformer 20 and the junction between reactor 18 and resistor 19. Circuits are provided for the control grids of electric valves 16 and 17 comprising opposite halves of the secondary winding of grid transformer 24 and current limiting resistors 25 and 26 respectively. In order to control the position of the armature 23 and the pressure on the carbon pile 19, I have provided a solenoid 27 energized from the direct current circuit 10 through an adjustable resistor 28. The solenoid 27 may be connected to the armature 23 and to the carbon pile 19 through any suitable link mechanism as illustrated and is preferably provided with a dash pot 29 to prevent hunting of the regulating apparatus.

In explaining the operation of the above described apparatus it will be assumed that initially the potential of the direct current circuit 10 is normal and that the solenoid 27 has adjusted the constants of reactor 18 and the carbon pile 19 to maintain such a phase relation between the grid potentials and anode potentials of the valves 16 and 17 that the average excitation of the field winding 13 is just sufficient to maintain this normal potential under existing load conditions. If the potential of the circuit 10 tends to drop, due to an increase in the load on the circuit or for any other cause, the solenoid 27 will assume a slightly lower position thus increasing the air gap 22 and decreasing the reactance of reactor 18, and decreasing the pressure on the carbon pile 19 and thus increasing its resistance. The effect of decreasing the reactance of reactor 18 and increasing the resistance of carbon pile 19 is to advance the phase of the potential applied to the grids of electric valves 16 and 17 so that these valves become conducting at an earlier point in their respective half cycles to increase the average unidirectional current delivered to the field winding 13 and thus raise the potential of machine 11 and circuit 10 to its normal value. It will be apparent that, should the potential of the circuit 10 tend to rise above the normal value for any cause, the reverse operation will take place and the excitation of field winding 13 will be reduced.

By properly setting the adjustable resistor 28, the apparatus may be made to maintain constant the potential of the circuit 10 at any desired value within wide limits.

As illustrated, the above described regulating apparatus is applied to a direct current generator 11, but it will be obvious to those skilled in the art that the apparatus is equally applicable to an alternating current generator supplying an alternating current circuit in which case the circuit 14 may be energized from the regulated machine.

While the above described apparatus for controlling the phase of the grid potentials of the valves 16 and 17 is particularly suitable for my improved regulating apparatus it is also of general application and may be utilized in any case where it is desired to control the current flowing through a translating circuit including an electric valve in response to some electrical variation or fluctuation by energizing the solenoid 27 in accordance with this electrical variable.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, an electric translating circuit including an electric valve provided with a control grid, a source of electrical variations, an impedance phase shifting circuit including a plurality of variable impedance elements, connections for impressing upon said control grid a potential derived from said phase shifting circuit to control the current flowing through said valve, and means responsive to said electrical variations for jointly controlling two of said impedance elements in an opposite sense.

2. In combination, an electric translating circuit including an electric valve provided with a control grid, an impedance phase shifting circuit including a variable resistor and a variable reactor, connections for impressing upon said control grid a potential derived from said phase shifting circuit to control the current flowing through said valve, and means responsive to an electrical condition of said circuit for jointly controlling said resistor and reactor.

3. In combination, an electric translating circuit including an electric valve provided with a control grid, an impedance phase shifting circuit including a reactor provided with a variable air gap and a carbon pile resistor, connections for impressing upon said control grid a potential derived from said phase shifting circuit to control the current flowing through said valve, and a solenoid, energized in accordance with an electrical condition of said circuit, for jointly controlling said air gap and said carbon pile.

4. In combination, a dynamo-electric machine provided with a field winding, an alternating current circuit, means for energizing said winding from said circuit including an electric valve provided with a control grid, a variable reactor and a carbon pile resistor serially connected across said circuit for producing dephased potentials, connections for impressing upon said control grid a potential derived from said series circuit, and means responsive to an electrical condition of said machine for controlling said reactor and said carbon pile.

5. In combination, a dynamo-electric machine provided with a field winding, an alternating current circuit, means for energizing said winding from said circuit including an electric valve provided with a control grid, a variable reactor and a carbon pile resistor serially connected across said circuit for producing dephased potentials, connections for impressing upon said control grid a potential derived from said series circuit, and a solenoid energized in accordance with the potential of said machine for jointly controlling said reactor and said carbon pile.

6. In combination, a dynamo-electric machine provided with a field winding, an alternating current circuit, means for energizing said winding from said circuit including an electric valve provided with a control grid, a resistor and an iron core reactor having a variable air gap serially connected across said circuit for producing dephased potentials, connections for impressing upon said grid a potential derived from said series circuit, and means for controlling said air gap in accordance with an electrical condition of said machine.

In witness whereof I have hereunto set my hand.

GEORGE W. GARMAN.